United States Patent
Gugin

[15] 3,677,349
[45] July 18, 1972

[54] STEERING DEVICE FOR CULTIVATING IMPLEMENTS

[72] Inventor: Robert J. Gugin, Minnedosa, Manitoba, Canada

[73] Assignee: Agristeel Limited, Minnedosa, Manitoba, Canada

[22] Filed: March 27, 1970

[21] Appl. No.: 23,435

[52] U.S. Cl. .............................................. 172/285, 172/288
[51] Int. Cl. ............................................... A01b 69/00
[58] Field of Search ................. 172/285, 288, 282, 284, 286, 172/289, 291

[56] References Cited

UNITED STATES PATENTS 3,543,865  12/1970  Tuttle et al. ............................ 172/288
3,219,126  11/1965  Lymburnur et al. .................... 172/286
3,516,500   6/1970  Butler .................................... 172/285 X
3,420,316   1/1969  Kirkpatrick ............................ 172/288

FOREIGN PATENTS OR APPLICATIONS 1,193,289   5/1965  Germany ............................... 172/288

Primary Examiner—Robert E. Pulfrey
Assistant Examiner—Stephen C. Pellegrino
Attorney—Kent & Ade

[57] ABSTRACT

A cable extends between an arm on the front furrow wheel, around guiding elements, to a further arm on the land wheel so that movement of one wheel initiates corresponding movement of the other wheel against spring pressure on the land wheel which maintains the cable taut under all conditions.

1 Claim, 1 Drawing Figure

Patented July 18, 1972
3,677,349
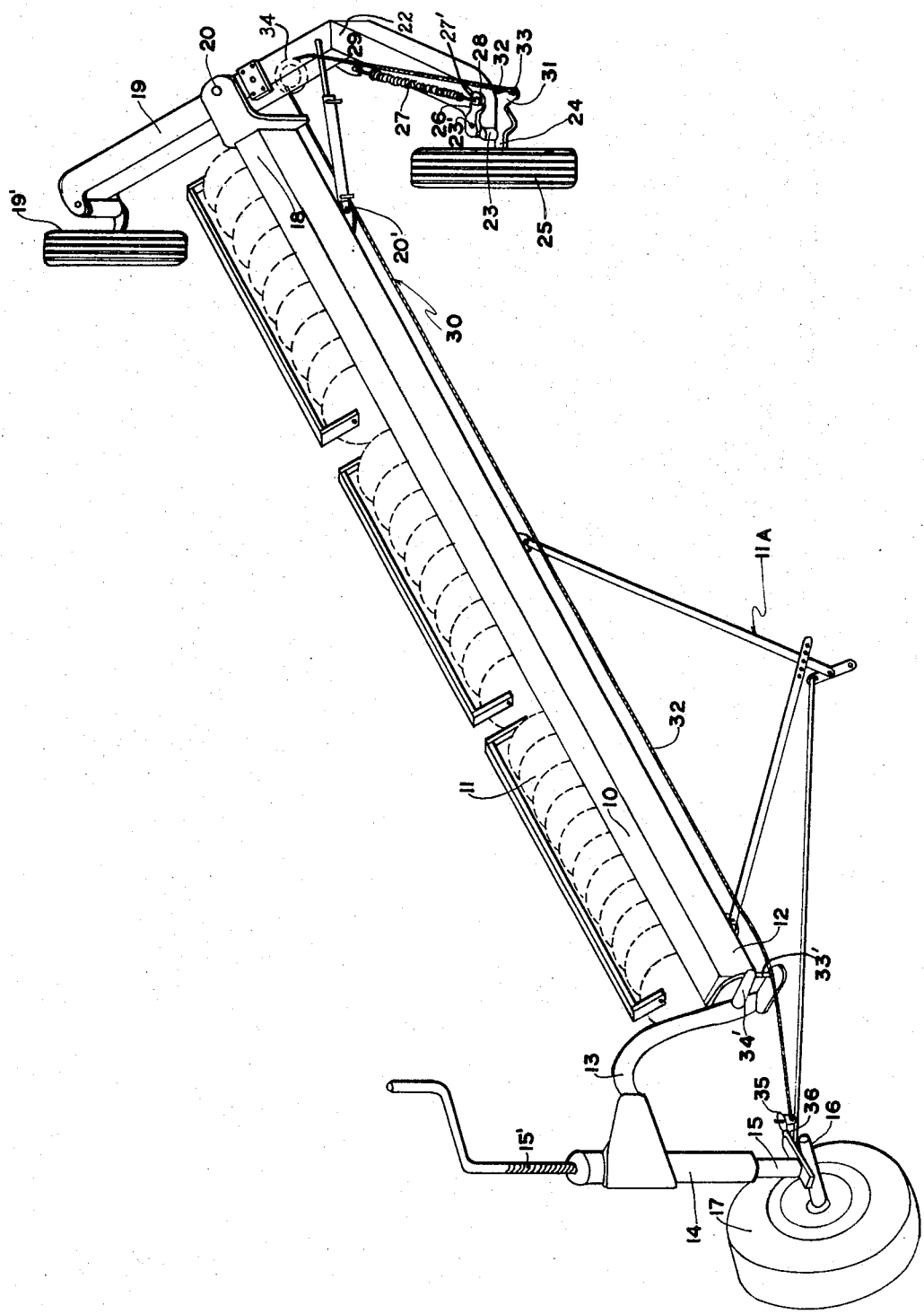
INVENTOR.
ROBERT J. GUGIN
BY
Kent & Ade

STEERING DEVICE FOR CULTIVATING IMPLEMENTS

This invention relates to new and useful improvements in land wheel steering arrangements for one way discers and similar cultivating implements.

Such machines usually include a main frame with gangs of discs or cultivators therebehind, said device being pulled by a source of power such as a tractor.

They usually include a front furrow wheel on one end of the main frame and a rudder arm on the other or trailing end of the main frame. The rudder arm has a wheel on the rear thereof and a land wheel on the front end thereof.

It is desirable to connect the front furrow wheel with the land wheel so that if one is turned, the other automatically takes up the same direction thus preventing skidding and facilitating turning of the implement either left or right.

The present invention shows a simplified connection between these two wheels and forms the basis of this invention.

An offstanding arm is secured to the front furrow wheel assembly and a cable is secured to this arm. It is routed along the main frames, around a sheave near the point of pivotal connection of the rudder beam and then to a further offstanding arm secured to the land wheel assembly so that movement of the first arm initiates similar movement in the second arm.

With the foregoing in view, and such other or further purposes, advantages or novel features as may become apparent from consideration of this disclosure and specification, the present invention consists of, and is hereby claimed to reside in the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying figures in which:

FIG. 1 is a fragmentary schematic isometric view of the frame of a one way discer showing the invention incorporated therein.

Proceeding therefore to describe the invention in detail, reference character 10 illustrates the main frame of a one way discer or similar cultivating implement, it being understood that gangs of discs indicated schematically by 11, are situated therebehind in the usual manner.

Also, it will be appreciated that conventional draft structure 11A is secured to the frame so that the device can be pulled by a tractor or the like.

Secured to the leading end 12 of the main frame is an arched member 13 supporting a vertical bearing tube 14 within which is engaged a vertical spindle 15 carrying an offstanding wheel axle 16 on the lower end thereof upon which is bearably supported a furrow wheel 17. This structure comprises the front furrow wheel assembly.

Conventional mechanism is included within the cylinder 14 so that a screw threaded adjusting handle 15' engaging within the upper end thereof, raises or lowers the front portion of the frame with relation to the ground. This structure is conventional.

Pivotally supported upon the rear or trailing end 18 of the main frame is a rudder beam assembly 19 supported intermediate the ends thereof by a vertical pivot pin 20. This ruder beam is angularly adjustable by conventional means 20' and carries upon the trailing end 21 thereof, a wheel assembly 19' also conventional in construction and operation.

The angulated forward end 22 of the rudder beam carries a vertical bearing tube 23 through which a shaft or spindle 23' is supported having an offstanding axle 24 on the lower end thereof upon which is bearably supported a land wheel 25.

A crank arm 26 is secured to the upper end of the spindle 23' within the bearing tube 23 and a compression spring 27 extends between the end 28 of this crank arm and an anchor point 29 upon the rudder beam normally maintaining the land wheel biassed in the direction of the compression spring 27. This spring surrounds a rod 27' sliding through a clevis 28' secured to the crank arm 26.

However, when the wheel 25 is forced to turn against the pressure of the spring due to the implement being turned, an interconnecting assembly collectively designated 30, operates. This assembly includes a further crank arm 31 which is secured to the lower end of the spindle 23' within the bearing tube 23 and a cable 32 extends from the end 33 of this crank arm, around a pulley or sheave 34 mounted upon the rudder beam adjacent the pivotal mounting pin 20 of the beam 19.

This cable 32 then runs substantially parallel to the main frame 10, along the front side thereof and around a guide 33'0 supported within brackets 34' extending from the member 13 and then to the end 35 of a crank arm 36 secured to the lower end of the spindle 15 on the front furrow wheel assembly. This means that any turning effort applied to wheel 25 due to the turning of the implement and against the pressure of spring 27, causes corresponding turning of the front furrow wheel 17. Conversely, when the machine straightens up, spring 27 returns the wheel 25 to the desired tracking alignment and at the same time slackens off cable 32 so that wheel 17 can also take up the same alignment due to castoring alignment.

Any turn initiated by the towing vehicle affects the angular relationship of the main frame and the front furrow wheel assembly, and this change of direction of the front furrow wheel finds corresponding change in direction of the land wheel 25 against pressure of spring 27.

Various modifications can be made within the scope of the inventive concept which is herein disclosed and/or claimed.

What is claimed to be the present invention is:

1. In a one-way type cultivating implement which includes a frame and a gang of cultivating elements therebehind, a steerable furrow wheel pivotally mounted at the leading end of said frame, a rudder beam pivoted to the trailing end of the frame, a steerable land wheel pivotally mounted on said rudder beam, a spring reacting between said rudder beam and said land wheel for biasing the latter in one steering direction, and means operatively connecting said furrow wheel to said land wheel for turning the latter in the opposite steering direction against the bias of said spring, said connecting means comprising a crank arm movable with said furrow wheel, a second crank arm movable with said land wheel, a guide provided at the leading end of said frame, a second guide provided at the trailing end of the frame adjacent the pivot point of said rudder beam to the frame, and a stretch of cable extending from the crank arm of the furrow wheel around the first mentioned guide, along the length of the frame, around the second guide and to the crank arm of the land wheel, whereby turning movement of the furrow wheel in said opposite steering direction may be transmitted by said cable to produce a corresponding movement of the land wheel against the bias of said spring.

* * * * *